United States Patent Office 3,390,894
Patented July 2, 1968

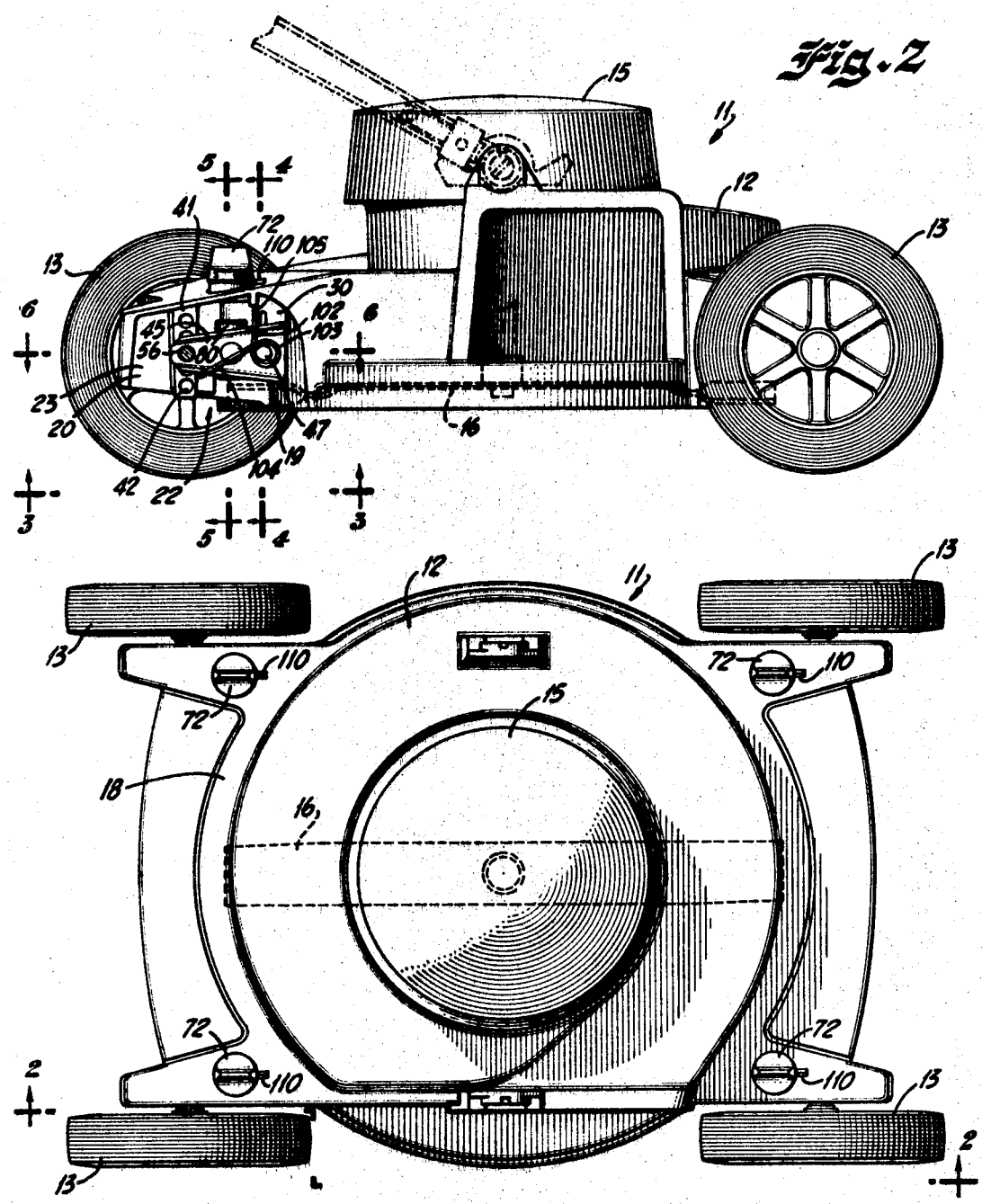

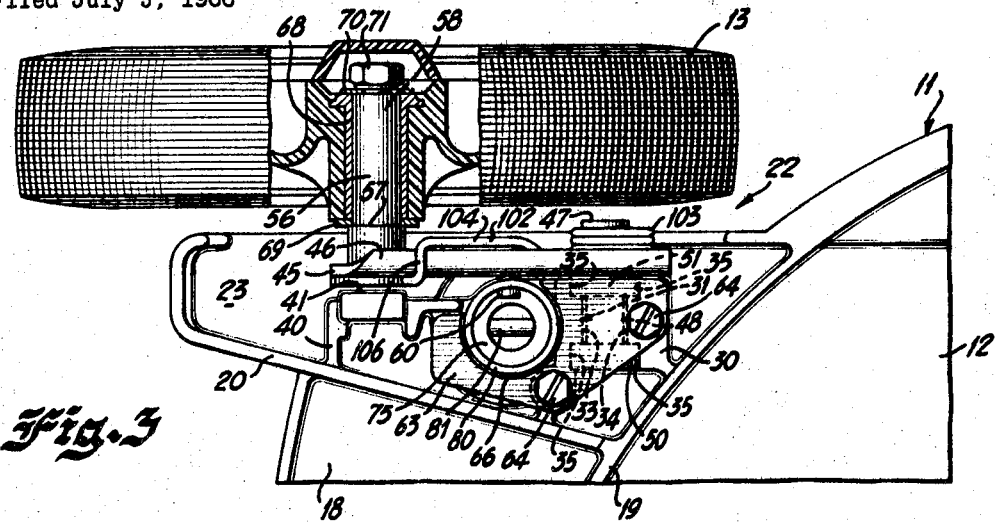
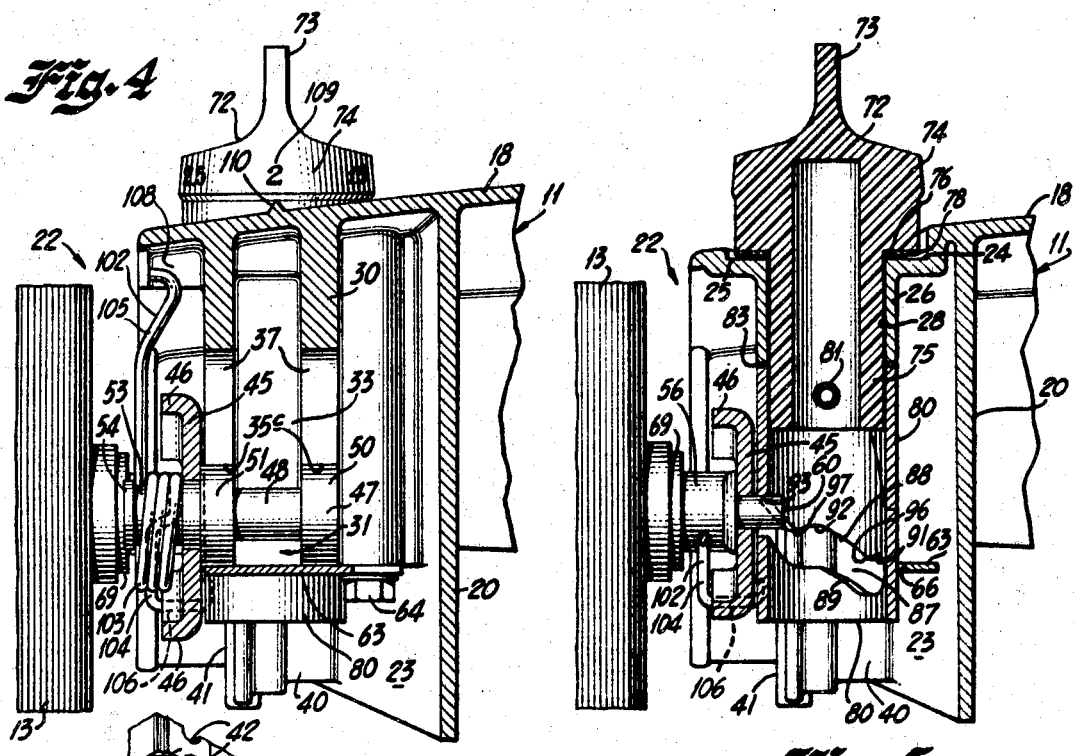

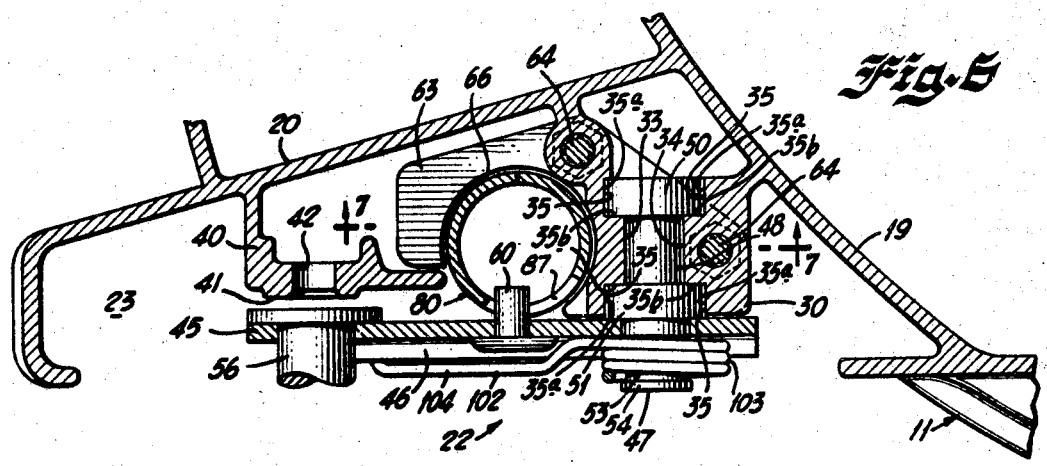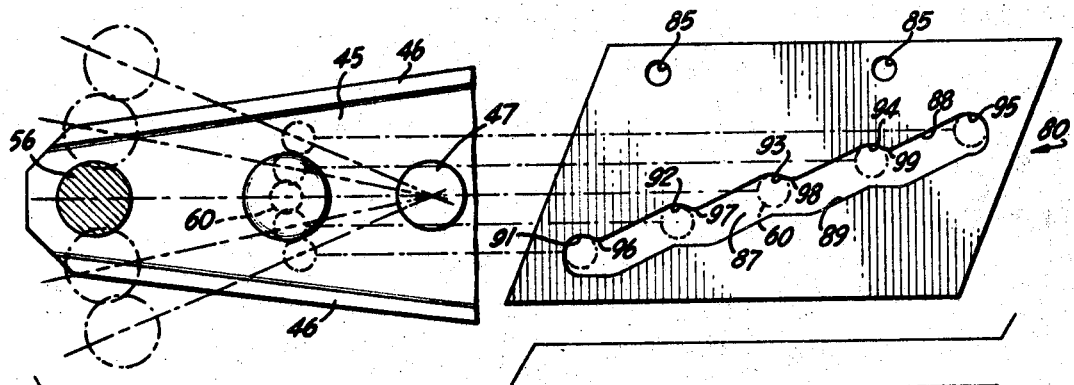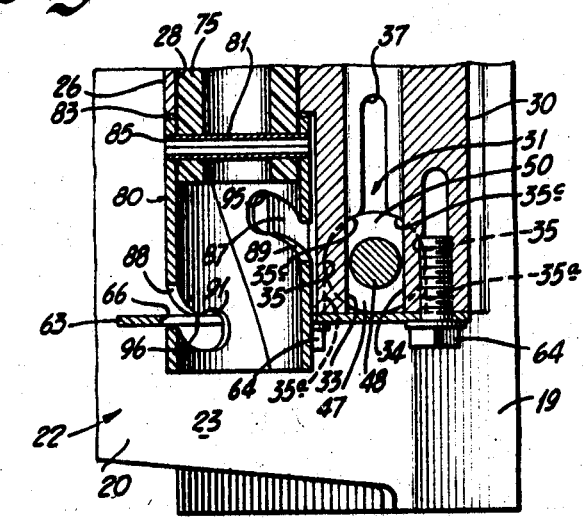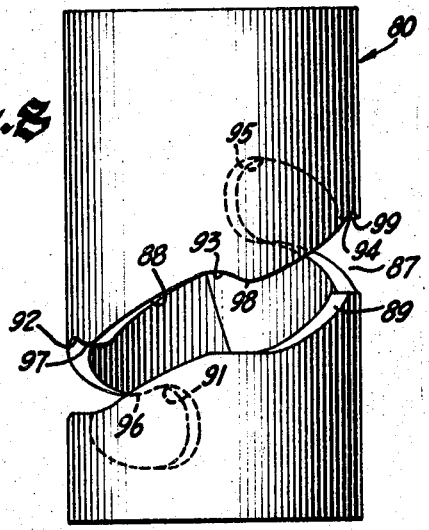

1

3,390,894
LAWN MOWER WITH AN ADJUSTABLE WHEEL SUPPORT
Marvin R. Olsen, Caldwell, Idaho, assignor to Sunbeam Corporation, Chicago, Ill., a corporation of Illinois
Filed July 5, 1966, Ser. No. 562,686
8 Claims. (Cl. 280—43.17)

ABSTRACT OF THE DISCLOSURE

A rotary lawn mower having an adjustable wheel support for vertically displacing a cutter with respect to the ground. This is accomplished by vertically moving the wheel with respect to the lawn mower housing by using a rotatable cam cooperating with a pivotal lever carrying the wheel.

---

This invention relates to adjustable wheel supporting means and more particularly to improved means for adjustably supporting the wheels of a lawn mower to vary the height of cut.

Currently, rotary lawn mowers are very popular because of their ability to cut rapidly various types of grass and weeds. This type of lawn mower employs a rotatable cutter blade mounted on a vertical drive shaft disposed in an inverted cup-shaped housing. Either an electric motor or gasoline engine may be utilized to rotate the drive shaft. It is desirable to provide means for adjusting conveniently the height at which grass is cut by the rotary cutting blade. The most common height adjustment means varies the height of the lawn mower housing with respect to the supporting wheels, and consequently, the distance between the cutter blade and the ground varies correspondingly.

In many prior art lawn mowers, each of the four wheels of the lawn mower is mounted on a pivotal lever which is held in a selected position by a spring biased detent member engaging in a plurality of housing apertures. When it is desired to change the height of cut, the pivotal lever is moved by manually disengaging the detent member from the housing aperture, pivoting the lever to another position and engaging the member into a different housing aperture. Thus, it is necessary for the user to disengage and engage the detent member while resisting a spring biasing force on the member and also to pivot the lever through a determined angle for proper alignment of the detent and housing aperture. Therefore, it would be desirable to have a lawn mower height adjustment means which could be operated by simply turning a control knob which is located conveniently on the lawn mower housing.

Accordingly, it is an object of the present invention to provide a new and improved height of cut adjustment means for a rotary lawn mower.

It is a further object of the present invention to provide an adjustable wheel supporting means which is integrated with the lawn mower housing wherein only a control knob is exposed.

It is an additional object of the present invention to provide a lawn mower having a wheel height adjustment means which is operated by simply rotating a control knob.

Yet another object of the present invention is to provide a wheel height adjustment wherein a control knob extends upwardly through an opening in the top wall of the lawn mower housing and the rotation of the knob varies the height of cut.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 1 is a top plan view of a rotary lawn mower having an adjustable wheel support embodying the present invention;

FIG. 2 is an elevational view of the lawn mower of FIG. 1 with one wheel removed in order to better disclose the wheel height adjustment means;

FIG. 3 is an enlarged fragmentary sectioned view taken along line 3—3 of FIG. 2 assuming that FIG. 2 illustrates the complete lawn mower, a portion of the tire is deleted to disclose the wheel bearing mounting;

FIG. 4 is an enlarged fragmentary sectioned view taken along line 4—4 of FIG. 2 assuming that FIG. 2 illustrates the complete lawn mower;

FIG. 5 is an enlarged fragmentary sectioned view taken along line 5—5 of FIG. 2 assuming that FIG. 2 illustrates the complete lawn mower;

FIG. 6 is an enlarged fragmentary sectioned view taken along line 6—6 of FIG. 2;

FIG. 7 is a fragmentary sectioned view taken along line 7—7 of FIG. 6;

FIG. 8 is a side elevational view of the sleeve cam;

FIG. 9 is a schematic showing of a layout of the cam sleeve and the wheel supporting lever to illustrate the corresponding locations of the lever pin and the wheel axle; and FIG. 10 is a fragmentary bottom perspective view of a portion of the lawn mower housing which supports portions of the wheel height adjustment means.

Briefly, the present invention relates to an adjustable wheel height mounting for a rotary lawn mower having a housing formed with an opening. The wheel mounting includes a lever which is secured to the housing at the pivotal connection therebetween so that the lever pivots in a vertical plane. A wheel is rotatably supported by the lever at a point spaced from the pivotal connection. A cam is supported by the housing adjacent to the pivotal lever and is disposed to rotate on a vertical axis. A connection is provided between the cam and the lever whereby the wheel is moved in a vertical direction with respect to the housing when the cam is rotated. A knob portion of the cam projects through the opening in the housing so that the user may rotate the cam.

Referring more specifically to the drawings, there is shown in FIG. 1 a rotary lawn mower generally designated by reference numeral 11 comprising an inverted cup-shaped housing 12 which is supported at each corner by a wheel 13. A motor housing 15 is supported on housing 12 and encloses an electric motor (not shown) which rotates cutter blade 16. Preferably, the housing 12 is die cast of aluminum and has the details set forth in copending patent application Ser. No. 562,666 filed July 5, 1966, and which is assigned to the same assignee as in the present application. The housing 12 includes a roof 18 and depending circular wall 19 forming a cutting chamber in which blade 16 rotates. At each corner of the housing, there is an outwardly projecting wall 20 which assists in supporting the wheel height adjustment means 22. The roof 18 extends outwardly to the end of wall 20 to form a chamber 23 for receiving the wheel height adjustment means 22. This chamber 23 is open on the bottom and outwardly facing side as may be seen in FIGS. 2 and 6. Over the chamber 23, the roof 18 is formed with a recess 24 having a flat horizontal annular surface 25 which leads to a depending hollow section 26. Hollow section 26 includes a bore 28 having a vertical axis which is centrally disposed with respect to the annular surface 25. Extending downwardly from roof 18 into chamber 23 is an inverted bifurcated mounting section 30 which is adjacent to bore 28 and connected to walls 19 and 20. As may be easily seen in FIG. 6, the mounting section 30 and walls 19 and 20 are integrally formed with the housing. The mounting section 30 has an upwardly extending slot 31 with opposed walls 33 and 34. Thus, opposed walls 33 and 34 are parallel and extend in vertical planes. As is best shown in FIG. 10, at each transverse end of opposed walls 33 and 34 is a recessed portion 35 defined by vertically extending surfaces 35a and 35b and a rounded upper surface 35c. It should be appreciated that the distance between complementary upper surfaces 35c across slot 31 is less than the distance between opposed walls 33 and 34. To lighten the weight of the housing, the slot 31 includes an upper slot 37 for reducing the amount of metal required for the housing. Extending downwardly from housing roof 18 is a vertical wall 40 which is integral with wall 20. The wall 40 has a vertical flat surface 41 containing a plurality of transverse openings 42. These openings 42 may be used for supporting a wheel if the wheel height adjustment means 22 is not employed.

In accordance with the present invention, there is provided a lever 45 having bent strengthening edges 46, and near one end of the lever there is a transverse stud 47 which is secured thereto in a rigid manner, such as welding. The stud 47 has a center recessed portion 48 of reduced diameter with enlarged portions 50 and 51 on each side thereof. The stud portions 48, 50 and 51 are cylindrical. Extending through the opposite side of the lever 45 is a stud projection 53 with a head 54 at the outer end. At the opposite end of the lever from the stud 47 is a wheel supporting axle 56 which is rigidly fastened to the lever in any suitable manner, such as welding. The wheel axle 56 has a shoulder 57, a cylindrical portion 58 and a threaded end (not shown in the drawing). Between the stud 47 and the wheel axle 56 is a pin 60 which is transversely disposed on lever 45. The pin 60 is rigidly secured to the lever 45 by any suitable manner, such as welding. Therefore, the lever assembly includes the lever 45, stud 47, wheel axle 46 and pin 60 which are in rigid engagement.

The lever 45 is pivotally supported on the housing 12 by the stud 47 being pivotally received at a fixed position in housing slot 31. As may easily be seen in FIG. 6, the stud reduced diameter portion or recess 48 is disposed between the opposed walls 33 and 34 while the enlarged stud portions 50 and 51 are received in the mounting section recesses 35 with the cylindrical surface of the enlarged stud portions engaging the rounded upper surface 35c and recess surfaces 35a and 35b. Thus, the stud may easily pivot within slot 31 and the lever is supported against pivoting horizontally by recess surfaces 35a, 35b and 35c being closely spaced to enlarged stud portions 50 and 51. Holding the stud 47 in mounting slot 31 is retaining plate 63 which is rigidly held to the bottom of mounting section 30 by means of a plurality of bolts 64. It should be noted that slot 31 is formed so that the rounded upper surface 35c engages the enlarged portions 50 and 51 while the plate 63 engages the bottom of the enlarged stud portions. Furthermore, the plate 63 has a circular opening 66 adjacent to mounting section 30. With this construction, the lever 45 is permitted to pivot in a vertical plane parallel to the axis of housing hollow section bore 28. In addition, the wheel axle 56 remains closely spaced to surface 41 of wall 40.

For the purpose of supporting housing 12, wheel 13 is rotatably supported on wheel axle 56. The wheel 13 includes a bushing bearing 68 which receives the wheel axle 56. A thrust washer 69 is positioned on the cylindrical portion of wheel axle 56 against shoulder 57. The wheel is maintained on the axle 56 by thrust washer 70 and nut 71 which is in threaded engagement with the axle. Thus, the wheel 13 may freely rotate on axle 56.

In order to control the movement of lever 45, there is provided control knob 72 having a finger gripping portion 73, an enlarged portion 74 and a tubular portion 75. Preferably, the knob is molded from a suitable plastic. Between the tubular portion 75 and the enlarged portion 74, there is formed a shoulder 76 which rests over the recess 24 of the housing roof 18 and the tubular portion 75 extends through the hollow section bore 28. Disposed between the knob shoulder 76 and the recess surface 25 is a spring washer 78 which tends to bias knob 72 upwardly. Attached to the lower end of the knob tubular portion 75 is a cam sleeve 80 which is secured thereto by a rolled pin 81 extending transversely through the cam sleeve 80 and tubular portion 75. As can be seen in FIG. 7, the cam sleeve 80 fits snugly over the tubular portion 75 so that there is a rigid connection therebetween. In addition, it should be appreciated that knob 72 rotates about a vertical axis defined by hollow section bore 28, and consequently, cam sleeve 80 rotates about the same axis. A thrust washer 83 is positioned between the cam sleeve 80 and the hollow section 26 in order to facilitate the easy rotation of the knob 72 and the sleeve 80. Thus, the spring washer 78 biases the assembly upwardly including knob 72, cam sleeve 80, pin 81 and washer 83 so that the fit between said assembly and the housing 12 is relatively tight. Assisting in the support of sleeve 80, the plate 63 is disposed so that the circular opening 66 receives the sleeve 80.

Preferably, the cam sleeve 80 is formed from a flat piece of steel as indicated in FIG. 9 wherein it has a parallelogram configuration. After the sleeve is rolled, it has a tubular shape as seen in FIG. 8. In the flat state, the sleeve is formed with openings 85 and a cam slot 87. When the cam sleeve is rolled in a tubular shape, the holes 85 are aligned and receive the rolled pin 81. The cam slot 87 is inclined and has an upper or cam surface 88. The cam slot 87 has a lower or retaining surface 89 which runs substantially parallel to the cam surface 88. The cam surface 88 defines a plurality of notches 91, 92, 93, 94 and 95, and immediately adjacent each cam notch are downwardly extending cam lobes 96, 97, 98 and 99 except for the uppermost or end notch 95. The pin 60 is positioned inside of cam slot 87 and is forced upwardly against the cam surface 88 by a torsion spring 102 having two arms 104 and 105 and a looped central portion 103 disposed around the stud projection 53. The lower spring arm 104 has a hook 106 at its end which fits over and engages with the bottom edge of lever 45. The upper spring arm 105 is held in a stationary position by a downwardly extending web 108 from housing roof 18. Thus, the torsional spring 102 biases the lever 45 upwardly or in a clockwise rotation as viewed in FIG. 2. It should be appreciated that the weight of the lawn mower 11 is carried by the ground wheels 13 which are supported on levers 45. Thus, not only does the torsional spring force the pin 60 in an upwardly direction but also the weight of the housing 12 forces the pin in the same direction. Consequently, the pin 60 is always being forced upwardly against the cam surface 88. The pin 60 is retained in a determined position along the cam surface 88 when the pin rests in a notch and is held there by a cam lobe. For a better understanding of the operation of the present invention, a review of FIG. 9 reveals the corresponding locations of wheel axle 56 and pin 60, shown in broken lines in cam slot 87 and on lever 45. The lever 45 and axle 56 are shown in solid lines only in the intermediate position where the pin 60 is in notch 93. When the pin 60 is in the uppermost notch 95, the wheel axle will be as indicated in the uppermost broken line position and when the pin is in the lowermost notch 91, the axle is in the lowermost position.

If it is desired to change the cutting height, the operator merely rotates the control knob 72 which causes the cam sleeve 80 to rotate correspondingly. Since the lever pin 60 is in engagement with the cam sleeve slot 87, the pin is cammed to a different vertical position. Due to the lobes 96 through 99 or the upper end of slot 87, the pin rests selectively in one of the notches 91 through 95. As the lever pin 60 is cammed to a different vertical elevation, the wheel axle 56 correspondingly assumes a different location with respect to the housing 12. In order that all four wheels may be set at the same elevation, the control knob 72 has indicia 109 on the enlarged portion 74 which can be aligned with a marker 110 which is integrally molded with the housing roof 18 adjacent to the recess 24. Thus, the user may easily change the wheel height position by merely rotating control knob 72. To facilitate the movement of the knob, the housing can be raised slightly off the ground to lessen the forces exerted upon the cam sleeve 80 by pin 60.

In view of the detailed description included above, the operation of the wheel height adjustment means of the present invention will readily be understood by those skilled in the art. This simple inexpensive arrangement thoroughly integrates the wheel height adjustment means with the lawn mower housing and provides a simple means whereby the height of the lawn mower cut may be set by merely rotating dials. In addition, the present invention provides a rugged construction that will withstand considerable abuse.

While there has been illustrated and described a single embodiment of the present invention, it will be understood that various changes and modifications of the invention will occur to those skilled in the art. It is aimed in the appended claims to cover all such changes and modifications as fall within the true scope of the present invention.

What is claimed as new and desired to be secured by Letters Patent of the United States is:

1. In a wheeled lawn apparatus comprising a housing, a lever secured to said housing at a pivotal connection therebetween so that said lever pivots in a vertical plane, a wheel rotatably carried by said lever at a point spaced from said pivotal connection, a cam having a vertically inclined cam surface mounted to said housing adjacent said lever for rotation on a vertical axis, means connecting said cam surface and lever whereby said wheel moves vertically with respect to said housing when said cam is rotated, said cam including a sleeve having an inclined slot which defines said cam surface, said connecting means comprising a transverse pin on said lever and said pin extending into said sleeve slot, said cam surface being provided with a plurality of downwardly facing notches for retaining said lever pin at selected elevations, torsional spring means biasing said lever upwardly so that said pin tends to remain at a selected notch.

2. In the wheeled lawn apparatus of claim 1 wherein said pin is disposed on said lever between said pivotal connection and wheel point.

3. In the wheeled lawn apparatus of claim 1 wherein said housing includes a roof having an opening, said cam being provided with a manually operable knob which extends through said housing roof opening whereby said wheel is selectively vertically movable by rotation of said knob.

4. In the wheeled lawn apparatus of claim 1 wherein said lever is provided with a transversely extending stud having a recessed portion, said housing defining upwardly extending slot having a complementary configuration for receiving said recessed stud so that said stud is pivotable therein, a plate secured to said housing for retaining and supporting said stud in said housing slot.

5. In the wheeled lawn apparatus of claim 1 wherein said cam includes a knob portion provided with an annular shoulder, said housing having a roof with a downwardly extending hollow section, said cam positioned so that said knob portion extends through said hollow section above said roof with said shoulder supported by said roof and said sleeve beneath and engaging said hollow section.

6. A lawn mower comprising an inverted cup-like housing being provided with a roof, said housing having an upwardly extending slot defined by opposed walls and having a rounded upper wall, said housing roof having an opening and a downwardly extending sleeve depending from said roof around said opening, a lever provided with a transversely extending stud, said stud having a central recessed portion and enlarged round head portion on each side thereof, said stud received within said housing slot so that said recessed portion lies between said opposed walls and said head portions in sliding engagement with said rounded upper wall whereby said stud is pivotable within said slot, means retaining stud within said housing slot, a wheel rotatably mounted to said lever, a cam rotatably disposed within said sleeve and having a knob portion extending above said roof, connection means between said cam and lever whereby the rotation of said knob portion moves said wheel with respect to said housing.

7. The lawn mower of claim 6 wherein said housing includes a wall extending adjacent to said lever immediately behind the mounting of said wheel on said lever whereby said wall assists in resisting transverse forces imposed upon said wheel.

8. The lawn mower of claim 6 wherein said retaining means including a plate which extends across the bottom of said housing slot and defines a circular opening into which said cam extends, means locking said plate to said housing whereby said plate traps said stud in said housing slot and provides lateral support for said cam.

References Cited

UNITED STATES PATENTS

| | | | |
|---|---|---|---|
| 2,737,682 | 3/1956 | Holtz | 16—32 |
| 2,776,844 | 1/1957 | Wilkin | 280—44 |
| 3,147,987 | 9/1964 | Ritums | 280—43.17 |

RICHARD J. JOHNSON, *Primary Examiner.*

BENJAMIN HERSH, *Examiner.*

J. E. SIEGEL, *Assistant Examiner.*